US008678810B2

(12) United States Patent
Atance Orden et al.

(10) Patent No.: US 8,678,810 B2
(45) Date of Patent: Mar. 25, 2014

(54) APPARATUS AND METHOD FOR THE PRODUCTION OF BI-MATERIAL HOLLOW BODIES BY MEANS OF INJECTION OVERMOLDING

(75) Inventors: Angel Atance Orden, Barcelona (ES); Alain Viron, Desmont (FR)

(73) Assignee: Industrial de Moldes y Matrices, S.A., Montcada I Reixac, Barcelona (ES)

( * ) Notice: Subject to any disclaimer, the term of this patent is extended or adjusted under 35 U.S.C. 154(b) by 398 days.

(21) Appl. No.: 13/162,713

(22) Filed: Jun. 17, 2011

(65) Prior Publication Data

US 2011/0298151 A1 Dec. 8, 2011

Related U.S. Application Data

(63) Continuation-in-part of application No. 12/184,542, filed on Aug. 1, 2008, now abandoned, which is a continuation-in-part of application No. PCT/ES2006/000047, filed on Feb. 3, 2006.

(51) Int. Cl.
 *B29C 45/16* (2006.01)
(52) U.S. Cl.
 USPC ............................. 425/533; 425/537; 425/556
(58) Field of Classification Search
 USPC .......................................... 425/533, 537, 556
 See application file for complete search history.

(56) References Cited

U.S. PATENT DOCUMENTS

| 4,744,742 | A | 5/1988 | Aoki |
| 4,784,281 | A | 11/1988 | Rozenberg |
| 5,573,791 | A | 11/1996 | Marcus |
| 5,766,651 | A | 6/1998 | Massano |
| 2002/0014720 | A1 | 2/2002 | Sicilia |

FOREIGN PATENT DOCUMENTS

| EP | 0688651 | 12/1995 |
| EP | 1834751 | 9/2007 |

OTHER PUBLICATIONS

International Search Report for PCT/ES2006/000047 mailed Oct. 26, 2006.

*Primary Examiner* — James Sanders
(74) *Attorney, Agent, or Firm* — RatnerPrestia

(57) ABSTRACT

An apparatus and method for the production of bi-material hollow bodies by injection overmolding. The apparatus includes: n base molding cavities or groups of base molding cavities inserted between n+1 overmolding cavities or groups of overmolding cavities or vice versa; and 2n cores or groups of cores which are fixed to a core holder plate mounted such that it can move in a transverse direction on a base plate that is actuated to move in a longitudinal direction in order alternately to insert each core into one of the base molding cavities, so as to mold a first layer, and into one of the overmolding cavities, so as to overmold a second layer. The apparatus also includes an ejecting device for ejecting the finished bi-material hollow bodies and a valve for alternately distributing the molding material to one or the other of the outer cavities.

11 Claims, 8 Drawing Sheets

APPARATUS AND METHOD FOR THE PRODUCTION OF BI-MATERIAL HOLLOW BODIES BY MEANS OF INJECTION OVERMOLDING

CROSS-REFERENCE TO RELATED APPLICATIONS

This application is a Continuation-in-Part application of U.S. patent application Ser. No. 12/184,542, filed Aug. 1, 2008 which is a Continuation-in-Part of PCT International Application No. PCT/ES2006/000047, filed Feb. 3, 2006.

FIELD OF THE INVENTION

The present invention generally relates to an apparatus and a method for the production of bi-material hollow bodies by means of injection overmolding, and more particularly for the production of bi-material pre-forms by means of injection overmolding.

BACKGROUND

The production of bi-material plastic parts has been a widespread technique for many years. The field of application is very broad, encompassing technical parts, for example, for automobiles, electronics, household appliances, etc., articles for the cosmetics, perfume, personal care industry, etc. Likewise, the type of raw materials, i.e., plastic resins, used is quite varied, and the purpose of using this technique can be for aesthetics, for example, providing parts of several colors, technical, for example, providing different technical properties specific for different areas of the part, or economical, for example, manufacturing a substantial area of the part with an economic material and other areas with a quality material, for example, to provide desired finishes or to comply with a predetermined sanitary condition.

Producing hollow bodies of plastic material is known, which bodies are herein generally referred to as "bi-material hollow bodies", formed by a base layer and a coating layer of different plastic materials. These bi-material hollow bodies include, for example, recipients such as vessels, containers, jars, etc., lids and caps for recipients, and parts for household appliances and vehicles.

Several methods for the production of bi-material plastic parts are known, the main methods being the following.

Overmolding by Means of Insert Transport.

The insert, i.e., the part formed by the first layer of base molding material, is transported from a base molding cavity in which it has been injected to another overmolding cavity in which the coating layer will be injected. This transport can be carried out manually or robotically. The base molding cavities and the overmolding cavities can be in two different molds mounted in two different injector presses or in one and the same double mold.

Overmolding by Means of Half-Mold Rotation.

This system allows overmolding the parts without previously extracting them from their initial mold. The parts are retained in the half-mold (usually on the ejecting side), the half-mold performs a rotation, generally 180°, and the position of the parts that are then overmolded in the overmolding cavities is inverted.

Overmolding by Core Displacement (Also Called Core-Back System).

A core acts as a valve to separate the base molding cavities from the overmolding cavities. First the base layer is molded in a base molding cavity, and then the core opens the passage to the overmolding cavity.

Co-Injection.

The two different materials are molded inside the same molding cavity. The system is based on making the second material pass through the first one to create several layers of different materials.

A particularly important group of bi-material hollow bodies is the group of pre-forms for the production of bottles and other recipients. These pre-forms consist of hollow bodies of plastic material in the form of a tube provided with a mouth and a neck, which optionally includes an external threading and a perimetrical ring-shaped flange. The pre-forms are intended for the later production of plastic bottles by blowing the part in the form of a tube inside a blow shaping mold, in which process the neck and the mouth are unaltered. The production of bi-material pre-forms can be carried out by several of the techniques mentioned above, for example, by overmolding by means of transporting the insert, overmolding by means of half-mold rotation, or co-injection. However, each of these techniques has drawbacks and/or limitations.

In the technique of overmolding by transporting the insert, when the insert is extracted from the base molding cavity, the recently molded base layer forming it is very hot and therefore in a soft state, which involves a risk of undergoing deformation or other damages during transport to the overmolding cavity. Furthermore, the equipment for applying this technique is complex and expensive, and requires a large availability of space given that it generally comprises using two molds, two injector presses, and a robot or other transport means.

In the technique of overmolding by means of half-mold rotation, the base molding and overmolding cavities are located symmetrically in relation to an axis of rotation of the mold. Accordingly, both injection steps must be inscribed in the surface of the injector press limited by the 4 columns of the press. For this reason, the size of the press must be enormous or the number of cavities of the mold very limited. Furthermore, the coolant fluid of the mold, which in the technique of bi-material injection must be abundant, must pass through a rotary joint, which additionally limits the capacity of the system. In addition, the pre-forms must be ejected in a displaced manner, and since the necessary force is very important, the ejecting system tends to be decompensated.

In the technique of co-injection, which is currently widely used, the layer of overmolding material cannot be perfectly delimited, whereby the final geometry of the base layer and the coating layer formed by different materials cannot be controlled exactly. This limitation, even though it allows the technique to be used for applying barrier layers, does not make it suitable for the use of recycled materials in combination with quality materials nor for generating aesthetic bicolor motifs by means of molding and overmolding two materials of different colors.

In another order of things, international patent application PCT 2006/ES 00001, belonging to one of the inventors of this invention, describes an apparatus for injection molding of pre-forms comprising a number n of rows of molding cavities alternately interposed between a number n+1 of rows of cooling cavities, and a number 2n of rows of cores fixed to a core plate adapted and actuated to be moved over the base plate in a transverse direction between two positions, in which the cores are aligned respectively with first and second sets of cavities. Each of said first and second sets of cavities is formed by said number n of rows of molding cavities and a number n of the rows of cooling cavities including one or the other of the end rows of cooling cavities, respectively. The base plate is actuated such that it can move in a transverse direction between a closed position, in which the cores are introduced in said first or second sets of cavities, and an open position, in which the cores are extracted from the first or second sets of cavities. Each core has associated thereto an ejecting element configured to define a part of the mold of the pre-form and actuated to perform a transverse movement along the core and thereby eject the pre-form. The ejecting elements are placed in several rows, each associated to one of the rows of cores. The ejecting elements of each row are connected to an ejecting plate, and the different ejecting plates are actuated independently by means of selecting elements to eject the pre-forms only from those rows of cores which have been extracted from rows of cooling cavities.

In this apparatus, the alternating movement of the core plate in combination with the movements of the base plate allows, in one position of the cores in relation to the molding and cooling cavities, injecting molding material in the molding cavities of pre-forms while at the same time other previously injected pre-forms are cooled in the cooling cavities, and subsequently, inverting the positions of the cores in relation to the molding and cooling cavities, after ejecting the cooled pre-forms, to inject new pre-forms on the recently released cores and simultaneously cooling the pre-forms recently injected in the previous position, and so on cyclically.

SUMMARY OF THE INVENTION

According to a first aspect, the present invention provides an apparatus for the production of bi-material hollow bodies by means of injection overmolding, comprising: a first hot channel connected to supply a base molding material to a number n+1 of base molding cavities or groups of base molding cavities, with n>1, said base molding material being intended for making a first layer of a bi-material hollow body; a second hot channel connected to supply an overmolding material to a number n of overmolding cavities or groups of overmolding cavities, said overmolding material being intended for making a second layer of said bi-material hollow body, wherein said base molding cavities or groups of base molding cavities and said overmolding cavities or groups of overmolding cavities are alternately arranged in a formation along a transverse direction, and wherein the cavities or groups of cavities located at the two ends of said formation are first and second end base molding cavities or first and second end groups of base molding cavities, respectively; a base plate on which there is mounted a core holder plate carrying a similar formation of a number 2n of cores or groups of cores, wherein said core holder plate is actuated to be moved alternately on the base plate in said transverse direction between two positions in which the cores or groups of cores are aligned respectively with first and second sets of cavities, each formed by said number n of overmolding cavities or groups of overmolding cavities and a number n of the base molding cavities or groups of base molding cavities including one or the other of said first and second end base molding cavities or first and second end groups of base molding cavities, respectively, and wherein said base plate is actuated to be moved in a longitudinal direction between a closed position, in which the cores or groups of cores are introduced in said first or second sets of cavities, and an open position, in which the cores or groups of cores are extracted from the first or second sets of cavities; valve means arranged in said first hot channel to alternately allow or interrupt the passage of base molding material towards the first and second end base molding cavities or first and second end groups of base molding cavities, according to the positions of the base plate and core holder plate; and ejecting means adapted to eject the finished hollow bodies only from those cores or groups of cores which have been extracted from overmolding cavities or groups of overmolding cavities, wherein said ejecting means comprise a number 2n of ejecting elements or groups of ejecting elements, with each ejecting element associated to one of the cores, said ejecting elements or groups of ejecting elements being connected to a common ejecting plate, each ejecting element having an innermost part located at a distance far enough from the corresponding core for not engaging said first layer of the bi-material hollow body arranged on the core and near enough to the corresponding core for engaging said second layer of the bi-material hollow body arranged on the first layer.

According to a further aspect, the present invention provides an apparatus for the production of bi-material hollow bodies by means of injection overmolding, comprising: a first hot channel connected to supply a base molding material to a number n of base molding cavities or groups of base molding cavities, with n>1, said base molding material being intended for making a first layer of a bi-material hollow body; a second hot channel connected to supply an overmolding material to a number n+1 of overmolding cavities or groups of overmolding cavities, said overmolding material being intended for making a second layer of said bi-material hollow body; wherein said base molding cavities or groups of base molding cavities and said overmolding cavities or groups of overmolding cavities are alternately arranged in a formation along a transverse direction, and wherein the cavities or groups of cavities located at the two ends of said formation are first and second end overmolding cavities or first and second end groups of overmolding cavities, respectively; a base plate on which there is mounted a core holder plate carrying a similar formation of a number 2n of cores or groups of cores, wherein said core holder plate is actuated to be moved alternately on the base plate in said transverse direction between two positions in which the cores or groups of cores are aligned respectively with first and second sets of cavities, each formed by said number n of base molding cavities or groups of base molding cavities and a number n of overmolding cavities or groups of overmolding cavities including one or the other of said first and second end overmolding cavities or first and second end groups of overmolding cavities, respectively, and wherein said base plate is actuated such that it can move in a longitudinal direction between a closed position, in which the cores or groups of cores are introduced in said first or second sets of cavities, and an open position, in which the cores or groups of cores are extracted from the first or second sets of cavities; valve means arranged in said second hot channel to alternately allow or interrupt the passage of overmolding material towards the first and second end overmolding cavities or first and second end groups of overmolding cavities, according to the positions of the base plate and core holder plate; and ejecting means adapted to eject the finished hollow bodies only from those cores or groups of cores which have been extracted from overmolding cavities or groups of overmolding cavities, wherein said ejecting means comprise a number 2n of ejecting elements or groups of ejecting elements, with each ejecting element associated to one of the cores, said ejecting elements or groups of ejecting elements being connected to a common ejecting plate, each ejecting element having an innermost part located at a distance far enough from the corresponding core for not engaging said first layer of the bi-material hollow body arranged on the core and near enough to the corresponding core for engaging said second layer of the bi-material hollow body arranged on the first layer.

The apparatuses of the first and third aspects of the invention are based on the mechanical operation of the apparatus described in the mentioned international patent application PCT 2006/ES 00001, with the inclusion of a number of modifications whereby it is possible to alternate consecutive molding operations of a first layer of a base molding material and overmolding operations of a second layer of an overmolding material to form bi-material hollow bodies instead of the known alternating molding and cooling operations. With this construction, the apparatuses of the invention generally allow producing bi-material hollow bodies, and particularly bi-material pre-forms, using a single mold and a single injection press. The apparatuses operate with a minimum transport of the cores, taking the first layer of base material from the base molding cavities to the overmolding cavities, which reduces or substantially eliminates the risk of damages in said first layer of base material, with a relatively small space requirement for a large number of cavities in one and the same mold, and with a high productivity.

The methods of the second and fourth aspects of the invention detail the steps to follow for the production of bi-material hollow bodies by means of such apparatuses.

All this makes it economically feasible to produce, with the apparatus and method of the present invention, bi-material hollow bodies for applications which, until now, with the known techniques, were unfeasible. For example, pre-forms adapted for making containers with a barrier property against a gas or light can be easily produced with the new apparatus and method by molding a first base layer of barrier material of a suitable thickness and overmolding an outer coating layer of a material suitable to give the outer appearance of the container, which can be, for example, either virgin or recovered PET.

According to another application, with the apparatus and method of the invention it is possible to produce pre-forms including the use of a recovered material, either recycled or directly crushed into flakes. In this case, and assuming that the pre-form is provided for making a food product container, the inner surface of the pre-form including the open end corresponding to the mouth of the container, can be made with a base layer of a quality material suited for food use, for example virgin PET, and the outer coating layer can be overmolded with a more economical material, for example recovered or recycled PET. The percentage of each of the two components is variable, being able to incorporate 50% of each by way of an application example. It is thus assured that the content of the container is in contact only with the suitable material, whereas the coating layer serves to provide structure to the container. This application does not reduce the quality of the container, and it can substantially reduce the cost of the product, since the raw material represents the most important cost of the final value of the pre-form. In addition to the economic advantage, the use of recovered material involves a huge advantage from the ecological point of view, since it allows the reuse and recovery of waste material.

Another application made possible by the apparatus and method of the invention is the production of bicolor pre-forms, mainly intended for providing an aesthetic value to the container, since with containers with a base color and a second color in the form of lines, bands or gradual fadings can be produced with them. To that end, for example, the base layer forming the inner surface of the pre-form including the open end corresponding to the mouth of the container is first molded with a material of a first color, and then the coating layer is overmolded with a material of a second color, generating the desired shapes. The design and the shapes of these colorings can generate a multitude of combinations, thereby it can have a very broad field of use.

In all cases, as a result of the consecutive base molding and overmolding steps, the base layer and the coating layer are accurately delimited, whereby preventing the problems of inaccuracies existing with the technique of co-injection explained above. In some cases, the selection of the molding and overmolding materials, as well as their injection conditions, allows producing bi-material hollow bodies or containers obtained by blowing bi-material pre-forms in which the two layers tend to separate from one another when they are subjected to certain mechanical deformations, for example, squeezing, thereby facilitating the separate recovery of the two materials at the end of the useful life of the object.

BRIEF DESCRIPTION OF THE DRAWINGS

The previous and other advantages and features will be fully understood from the following detailed description of exemplary embodiments with reference to the attached drawings, in which.

DETAILED DESCRIPTION OF EXEMPLARY EMBODIMENTS

Figure 1:
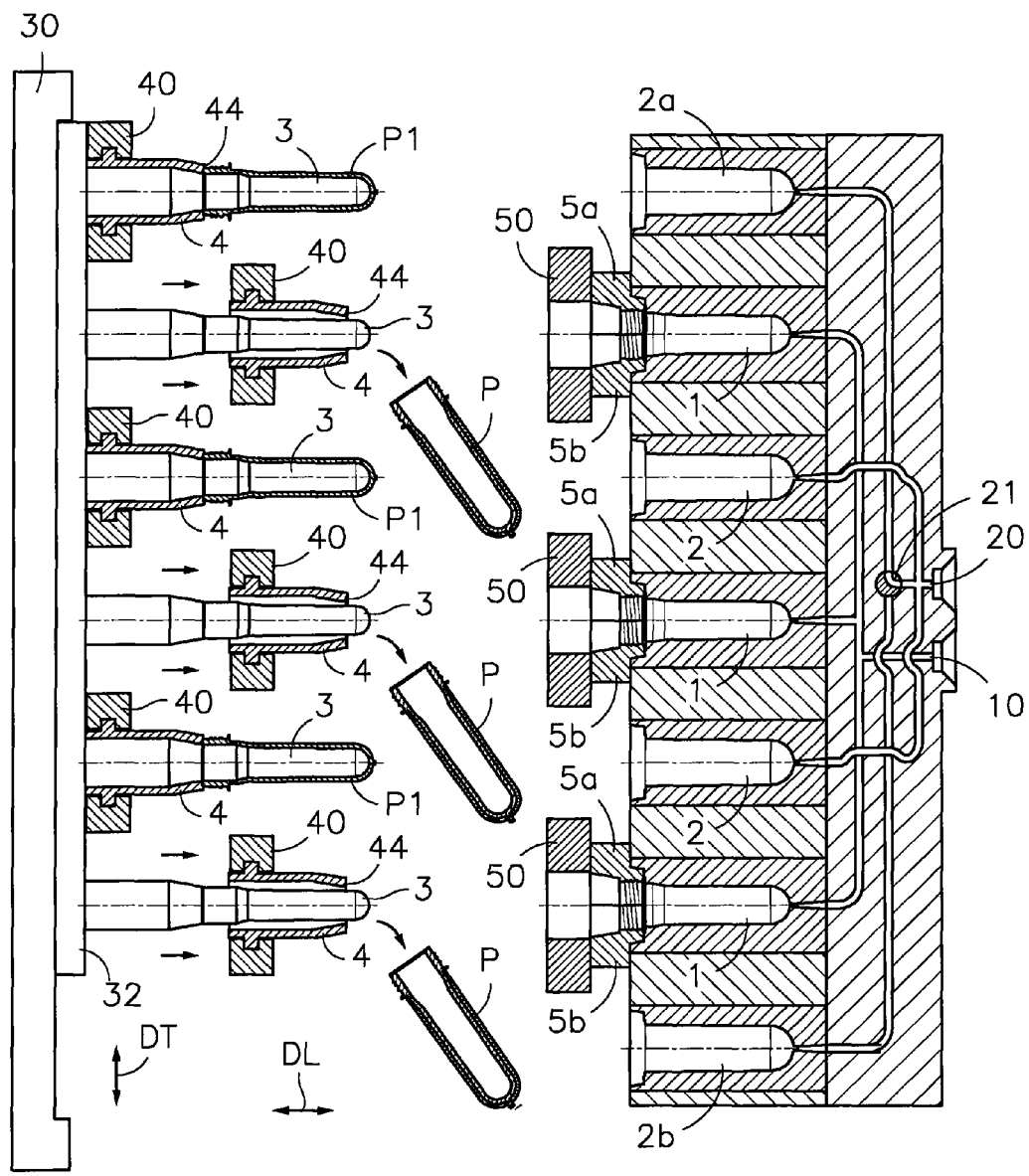
FIG. 1 is a diagrammatic longitudinal cross section view of an apparatus for the production of bi-material hollow bodies by means of injection overmolding according to a first embodiment of the invention.

With reference first to FIG. 1, it shows an apparatus for the production of bi-material hollow bodies by means of injection overmolding according to a first embodiment of the invention. In the first embodiment of FIG. 1, the mentioned hollow body is a first type of bi-material pre-form P shown in longitudinal cross section in FIG. 3.

Figure 3:
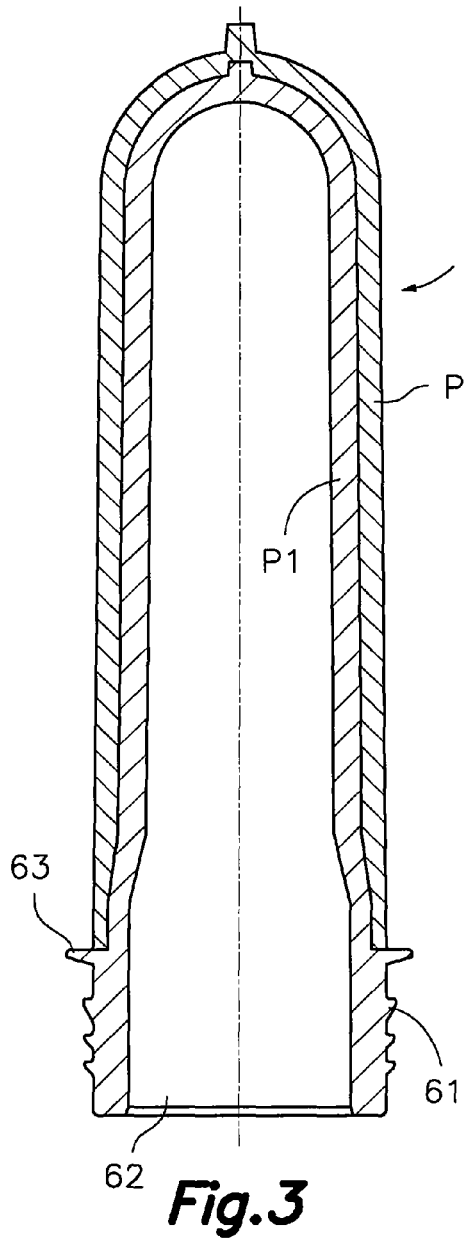
FIG. 3 is a longitudinal cross section view of an example of a bi-material hollow body obtained by means of the apparatus of FIG. 1.

The bi-material pre-form of FIG. 3 comprises a hollow body of plastic material in the form of tube having a closed bottom at a first end and, and a mouth 62, a neck 61 with an external threading and a perimetrical ring-shaped flange 63 at an opposite second end. These pre-forms P are intended for the subsequent production of plastic bottles by blow molding. In the blow molding process, the bi-material pre-form is inserted in a mold and the part of the tube including said closed bottom is inflated until adopting the form of the hollow body of a vessel or container defined by the mold, whereas the neck 61, the mouth 62 and the perimetrical ring-shaped flange 63 remain unchanged. The bi-material pre-form P is formed by a first layer P1 made of a base molding material, for example, virgin PET and a second layer P2 made of an over-molding material, for example, recovered or recycled PET, which is applied by overmolding on said first layer P1. In this example of FIG. 3, the neck 61, the mouth 62 and the perimetrical ring-shaped flange 63 are defined by the first layer P1. This means that a product contained in a container or vessel produced by blowing this bi-material pre-form P of FIG. 3 will never come into contact with the second layer P2, thus preventing, for example, the recovered or recycled material forming the second layer P2 from being able to contaminate the product.

The apparatus of the first embodiment comprises a fixed part, shown on the right of FIG. 1, and a mobile part, shown on the left of FIG. 1. In the fixed part there are arranged a number n (three in the example shown) of base molding cavities 1 and a number n+1 (four in the example shown) of overmolding cavities 2, 2a, 2b. The mentioned base molding cavities 1 and said overmolding cavities 2, 2a, 2b are alternately arranged in a formation along a transverse direction DT which is perpendicular to a longitudinal direction DL parallel to a demolding direction, with the particularity that the cavities located in the two ends of said formation are first and second end overmolding cavities 2a, 2b, respectively. A first hot channel 10 is connected to supply a base molding material to said base molding cavities 1 and a second hot channel 20 is connected to supply an overmolding material to said overmolding cavities 2, 2a, 2b.

The mobile part comprises a base plate 30 on which there is mounted a core holder plate 32 carrying a similar formation of a number 2n (six in the example shown) of cores 3. The core holder plate 32 is actuated to be moved alternately on the base plate 30 in said transverse direction DT between two positions in which the cores 3 are aligned respectively with first and second sets of cavities. The first set of cavities is formed by said number n (three in the example shown) of base molding cavities 1 and a number n (three in the example shown) of the overmolding cavities 2, 2a including all the overmolding cavities 2 arranged between the base molding cavities 1 and the first end overmolding cavity 2a shown on the top of FIG. 1. The mentioned second set of cavities is formed by said number n (three in the example shown) of base molding cavities 1 and a number n (three in the example shown) of the overmolding cavities 2, 2b including all the overmolding cavities 2 arranged between the base molding cavities 1 and the second end overmolding cavity 2b shown on the bottom of FIG. 1. The base plate 30 is further actuated to be moved in said longitudinal direction DL between a closed position, in which the cores 3 are introduced in said first or second sets of cavities, and an open position, in which the cores 3 are extracted from the first or second sets of cavities. The apparatus also comprises valve means represented by a valve 21 arranged in said second hot channel 20 to alternately allow or interrupt the passage of overmolding material towards the first and second end overmolding cavities 2a, 2b according to the positions of the base plate 30 and of the core holder plate 32. The mobile part further includes ejecting means adapted to ejecting the overmolded, i.e., finished, bi-material pre-forms P only from those cores 3 which have been extracted from one of the overmolding cavities 2, 2a, 2b. In the embodiment shown in FIG. 1, said ejecting means comprise a number 2n (six in the example shown) of ejecting elements 4, each ejecting element 4 being associated to one of the cores 3. These ejecting elements 4 are connected to respective ejecting plates 40 actuated by actuation means (not shown) such that they can be moved independently and alternately between molding and ejecting positions.

In the embodiment shown in FIG. 1, each ejecting element 4 has the form of a bushing arranged around the corresponding core 3 and comprises an end ring-shaped surface 44 surrounding the core 3. In said molding position (shown in relation to the cores 3 opposite to the first set of overmolding cavities 2 including the first end overmolding cavity 2a in FIG. 1), said end ring-shaped surface 44 of the ejecting element 4 is adjacent to the beginning of a mold surface of the core 3, and in the ejecting position (shown in relation to the cores 3 opposite to the base molding cavities 1 in FIG. 1), the end ring-shaped surface 44 of the ejecting element 4 is close to or beyond the free end of the core 3. In the movement between the molding position and ejecting position, the end ring-shaped surface 44 of those ejecting elements 4 that are moved make contact with the finished bi-material pre-form P and ejects it from the cores 3.

Furthermore, at least one part of the end ring-shaped surface 44 of each ejecting element 4 is adapted to act as a mold surface for the mold for molding the first layer P1 made of the base molding material when the ejecting element 4 is in the molding position and the base plate 30 is in the closed position.

The apparatus comprises half-mold holder plates 50 on which there are mounted a number n (three in the example shown) of pairs of half-molds 5a, 5b, each pair of half-molds 5a, 5b being adapted and actuated to be closed next to the opening of the base molding cavities 1, and to be opened. The half-molds 5a, 5b of each pair have corresponding inner surfaces forming a part of said mold for molding the first layer P1 made of base molding material of the bi-material pre-form P. More specifically, the half-molds 5a, 5b are adapted for molding the externally threaded neck 61. Thus, when the base plate 30 is in the closed position, an inner surface of the base molding cavities 1, an outer surface of the cores 3, the mentioned end ring-shaped surface 44 of the ejecting elements 4 and said inner surfaces of the half-molds 5a, 5b are adapted to form a mold for molding said first layer P1 made of base molding material of the bi-material pre-form P, including the externally threaded neck 61 formed by the inner surfaces of the half-molds 5a, 5b. An injection of base molding material through the first hot channel 10 forms the first layer P1 on the cores 3 introduced in the base molding cavities 1.

Then, the cores 3 on which the first layer P1 have been molded are extracted from the base molding cavities 1 and then introduced in one of the first or second sets of overmolding cavities 2 including one of the first and second end overmolding cavities 2a, 2b by combined movements of the base plate 30, the core holder plate 32 and the half-mold holder plate 50. Supposing that the cores 3 are introduced in the first set of overmolding cavities 2 including the first end overmolding cavity 2a, in this new position, an inner surface of the overmolding cavities 2 of the first set including the first end overmolding cavity 2a and an outer surface of the first layer P1 of base molding material arranged on the cores 3 are adapted to form a mold for overmolding the second layer P2.

An injection of overmolding material into the overmolding cavities 2 of the first set including the first end overmolding cavity 2a through the second hot channel 20 produces the second layer P2 on the first layer P1 to complete the bi-material pre-forms P. To that end, the valve 21 has been previously placed in a position (shown in FIG. 1) allowing the passage of overmolding material only towards the overmolding cavities 2 of the first set including the first end overmolding cavity 2a.

At the same time as the injection of overmolding material into the overmolding cavities 2 of the first set including the first end overmolding cavity 2a occurs, the first layer P1 of a new bi-material pre-form P is molded on the other cores 3 which have been simultaneously introduced in the base molding cavities 1 by means of a new injection of base molding material through the first hot channel 10. Then, a movement of the base plate 30 in the longitudinal direction DL towards its open position extracts both cores 3 from the respective base molding cavities 1 and overmolding cavities 2 of the first set including the first end overmolding cavity 2a.

A subsequent movement of the core holder plate 32 in the transverse direction DT on the base plate 30 aligns the cores 3 recently extracted from overmolding cavities 2 of the first set including the first end overmolding cavity 2a with the base molding cavities 1 and the cores 3 recently extracted from the base molding cavities 1 with the overmolding cavities 2 of the second set including the second end overmolding cavity 2b. The finished bi-material pre-forms P are then ejected from the cores 3 which have been aligned with the base molding cavities 1 by a movement of the corresponding ejecting plates 40, and the valve 21 is placed in a position (not shown) allowing the passage of overmolding material only towards the overmolding cavities 2 of the second set including the second end overmolding cavity 2b.

Then, a new movement of the base plate 30 in the longitudinal direction DL towards its closed position introduce the cores 3 in the base molding cavities 1 and in the overmolding cavities 2 of the second set including the second end overmolding cavity 2b, and the half-molds 5a, 5b are closed and arranged in a molding position next to the mouth of the base molding cavities 1. In this position, a new simultaneous injection of base molding material into the base molding cavities 1 through the first hot channel 10 and of overmolding material into the overmolding cavities 2 of the second set including the second end overmolding cavity 2b through the second hot channel 20 is performed. New combined movements of the base plate 30, the core holder plate 32 and the half-mold holder plate 50 extract the cores 3 from the respective base molding cavities 1 and overmolding cavities 2 of the second set including the second end overmolding cavity 2b and again align the cores 3 with the overmolding cavities 2 of the first set including the first end overmolding cavity 2a and with the base molding cavities 1.

The finished bi-material pre-forms P are then ejected from the cores 3 which has been aligned with the base molding cavities 1 by a movement of the corresponding ejecting plates 40, and the valve 21 is again placed in the position allowing the passage of overmolding material only towards the overmolding cavities 2 of the first set including the first end overmolding cavity 2a, which situation is shown in FIG. 1. From this point, the cycle can be repeated indefinitely to produce bi-material pre-forms P.

The ejecting operation of the bi-material pre-forms P is preferably carried out when the corresponding cores 3 are in symmetric positions in relation to the center of base plate 30 to prevent undesired torques and to facilitate the collection of the ejected hollow bodies. In this embodiment of FIG. 1, the ejecting operation is carried out when the corresponding cores 3 are aligned with the base molding cavities 1, i.e., after the extraction of the cores 3 and after its movement in the transverse direction DT.

For a person skilled in the art of molds and injection molding apparatuses, it will be obvious that the apparatus previously described in relation to FIG. 1 allows multiple variants and can be applied to the production of other types of bi-material pre-forms or of bi-material hollow bodies other than the bi-material pre-forms P. In all the embodiments of the present invention, the mentioned number n is greater than 1 (n>1) in order to maximize the productivity of the apparatus.

Figure 2:
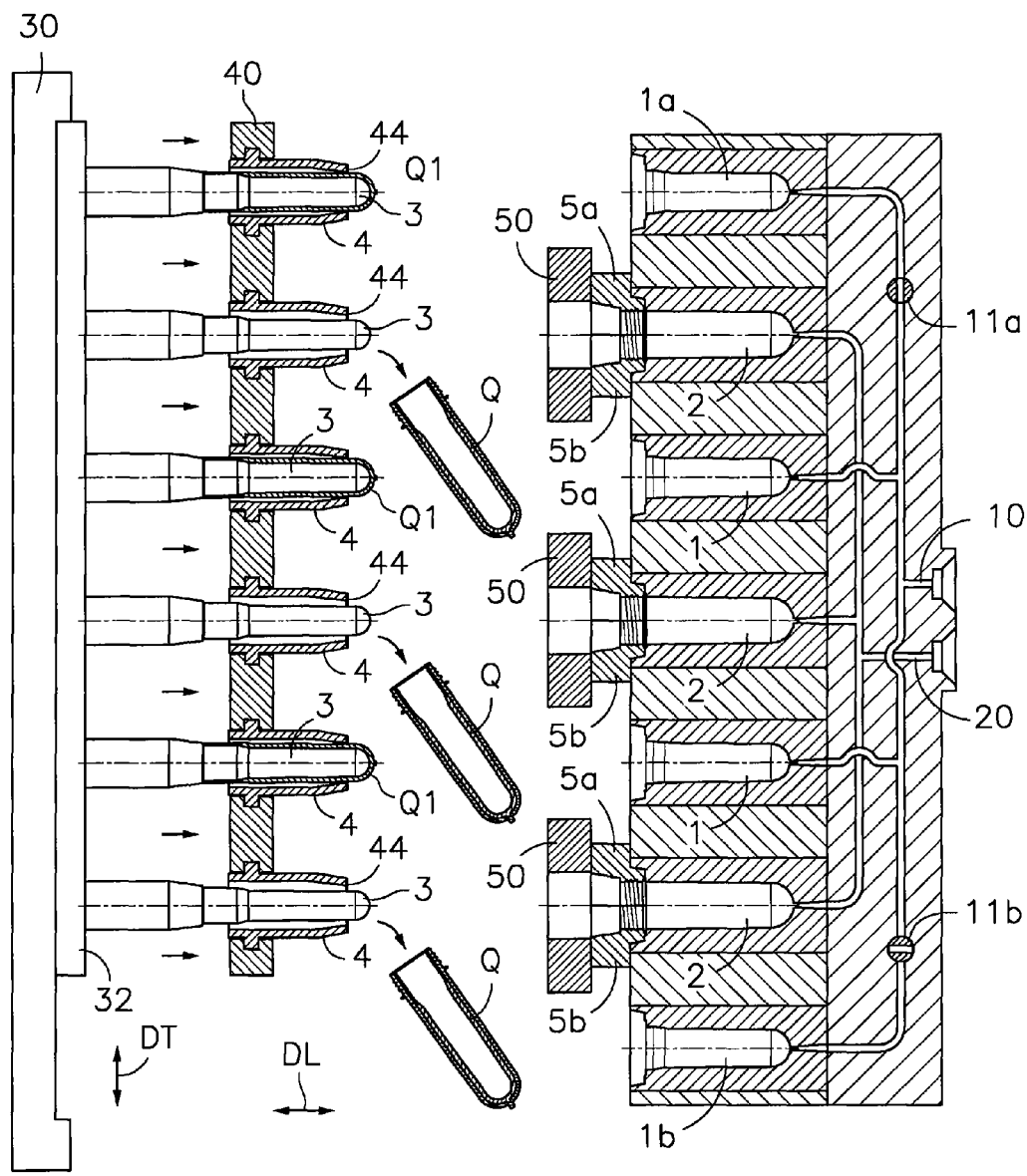
FIG. 2 is a diagrammatic longitudinal cross section view of an apparatus for the production of bi-material hollow bodies by means of injection overmolding according to a second embodiment of the invention.

FIG. 2 shows an apparatus according to a second embodiment of the present invention which has a reverse construction with respect to the first embodiment described in relation to FIG. 1, and the same reference numerals are used to designate identical or equivalent elements. The apparatus of this second embodiment is adapted to produce hollow bodies in the form of bi-material pre-forms Q as that shown in FIG. 4.

Figure 4:
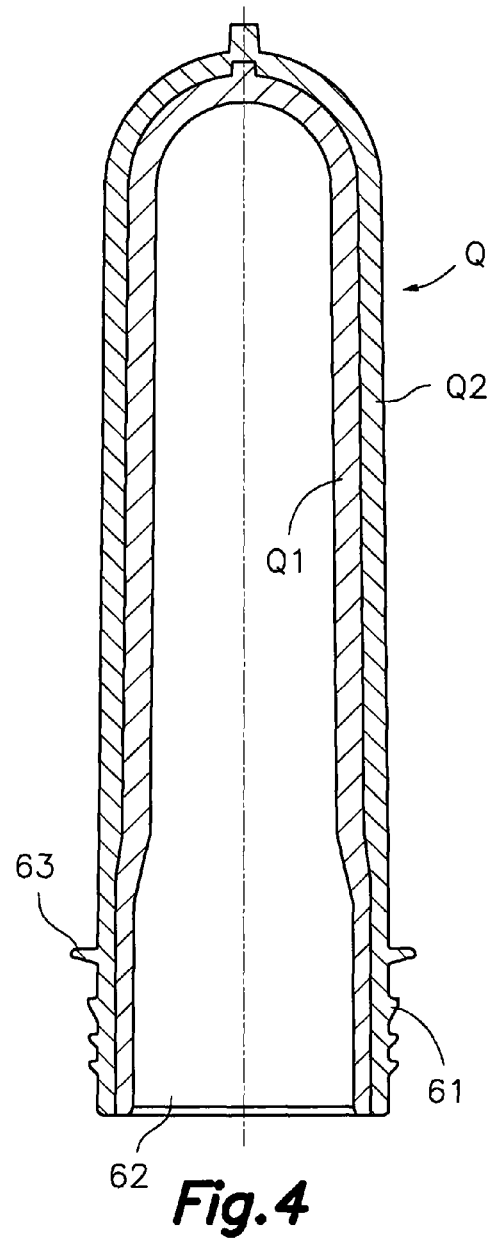
FIG. 4 is a longitudinal cross section view of an example of a bi-material hollow body obtained by means of the apparatus of FIG. 2.

FIG. 4 shows the mentioned bi-material pre-form Q, which, like the bi-material pre-form P of FIG. 3, comprises a tubular body having a closed bottom at a first end and a mouth 62 at an opposite second end, wherein said tubular body is comprised of a first layer Q1 made of a base molding material and a second layer Q2 made of an overmolding material. The difference is that here, the external threading of the neck 61 and the perimetrical ring-shaped flange 63 are formed by the overmolding material of the second layer Q2. The first layer Q1 internally covers the tubular body including the closed bottom and the neck 61 till the mouth 62. This geometry can be useful, for example, for the generation of a container with a layer of barrier material either inside (first layer Q1) or outside (second layer Q2), since in this example both layers cover the entire bi-material pre-form Q and the container generated by blow molding thereof.

The apparatus of the second embodiment shown in FIG. 2 comprises a fixed part provided with a first hot channel 10 connected to supply base molding material to a number n+1 of base molding cavities 1, 1a, 1b and a second hot channel 20 connected to supply overmolding material to a number n of overmolding cavities 2, with the particularity that the base molding cavities 1, 1a, 1b and the overmolding cavities 2 are arranged alternately in a formation along the transverse direction DT, and that the cavities located at the two ends of said formation are first and second end base molding cavities 1a, 1b, respectively. The mobile part comprises a number 2n of cores 3 arranged in a formation along the transverse direction DT and fixed to a core holder plate 32 actuated to move in the transverse direction DT on a base plate 30 actuated to move in the longitudinal direction DL, as well as ejecting elements 4, each in the form of a bushing arranged around one of the cores 3 in a similar way than described above in relation to the first embodiment shown in FIG. 1.

In this second embodiment, the valve means are represented by a pair of valves 11a, 11b arranged in the first hot channel 10 to alternately allow or interrupt the passage of base molding material towards the first and second end base molding cavities 1a, 1b, according to the positions of the base plate 30 and core holder plate 32. It must be indicated that the arrangement of the two valves 11a and 11b shown in FIG. 2 and the single valve 21 shown in FIG. 1 are two different alternatives for the valve means indifferently applicable to any embodiment of the invention. The selection of one or the other will depend on factors such as the viscosity of the molten plastic material to be injected, machining ease, mechanical simplicity of the mold, etc.

The half-mold holder plates 50 on which there are mounted a number n of pairs of half-molds 5a, 5b for molding the threading of the outer part of the neck 61 of the bi-material pre-form Q are associated to the openings of the overmolding cavities 2. In a first position of the core holder plate 32 (shown in FIG. 2) the cores 3 are aligned with a first set of cavities formed by the base molding cavities 1 including the first end base molding cavity 1a and the overmolding cavities 2. In a second position of the core holder plate 32 (not shown) the cores 3 are aligned with a second set of cavities formed by the overmolding cavities 2 and the base molding cavities 1 including the second end base molding cavity 1b.

Another difference of the second embodiments with respect to the first one is that all the ejecting elements 4 are connected to a common ejecting plate 40 actuated to move in the longitudinal direction DL between a molding position (not shown) and an ejecting position (FIG. 2). Each ejecting element 4 has an innermost diameter greater than an outermost diameter of the first layer Q1 and less than an outermost diameter of the second layer Q2 of the bi-material pre-form Q, so that in spite of all the ejecting elements 4 being moved together by the common ejecting plate 40 to their ejecting position, only the ejecting elements associated to those cores 3 carrying a finished bi-material hollow body Q will engage the second layer Q2 and eject the finished bi-material pre-forms Q. In other alternative embodiments where the apparatus is adapted to make not circular bi-material hollow bodies, the ejecting elements 4 will have an innermost part located at a distance far enough from the corresponding core for not engaging the first layer made of said base molding material of the bi-material hollow body arranged thereon and near enough to the corresponding core for engaging the second layer made of said overmolding material of the bi-material hollow body arranged thereon.

It should be noted that this feature of moving the ejecting elements 4 all together by means of a common ejecting plate 40 is not applicable to the apparatus of the first embodiments because there, the neck 61 including the threaded outer part of the bi-material pre-form P is made of the base molding material of the first layer P1 (FIG. 3). However, in both first and second embodiments shown in FIGS. 1 and 2, the operation of the ejecting elements 4 for ejecting the bi-material pre-forms P, Q are preferably carried out when the corresponding cores 3 are aligned respectively with the base molding cavities 1 or overmolding cavities 2, i.e., when the corresponding cores 3 are in symmetrical positions in relation to the center of the base plate 30.

In the second embodiment, each ejecting element 4 has an end ring-shaped surface 44 that forms a part of the mold for overmolding the second layer of the hollow body when the mobile part of the apparatus is in a closed position on the fixed part. Thus, in the apparatus of the second embodiment, the mold for molding the first layer Q1 of the bi-material pre-forms Q is formed by an inner surface of the base molding cavities 1, 1a, 1b and an outer surface of the cores 3, and the mold for overmolding the second layer Q2 of the bi-material pre-form Q is formed by an inner surface of the overmolding cavities 2, an outer surface of said first layer Q1 arranged on the cores 3, the end ring shaped surface 44 of the ejecting elements 4, and said inner surfaces of the half-molds 5a, 5b, which provide the mold surface for the outer part of the externally threaded neck 61.

Obviously, both in the first embodiment shown in FIG. 1 and in the second embodiments shown in FIG. 2, the change of position of the valve 11a, 11b, 21 and the ejection of the finished bi-material pre-form P, Q can be carried out indifferently before or after the extraction of the cores 3 by a movement of the base plate 30 towards its open position and before or after the movement of the cores 3 towards their positions aligned with the cavities adjacent to the cavities from which they have been extracted. Obviously, both the valve 21 shown in FIG. 1 and the valves 11a, 11b shown in FIG. 2 are shown schematically and can be substituted with any other valve means adapted to carry out the same functions. Optionally, the half-mold holder plates 50 and respective pairs of half-molds 5a and 5b can be associated to the cavities including the end cavities, either end base molding cavities 1a, 1b or end overmolding cavities 2, instead of the intercalated cavities, although this involves a useless duplication of mechanisms.

Figure 5:
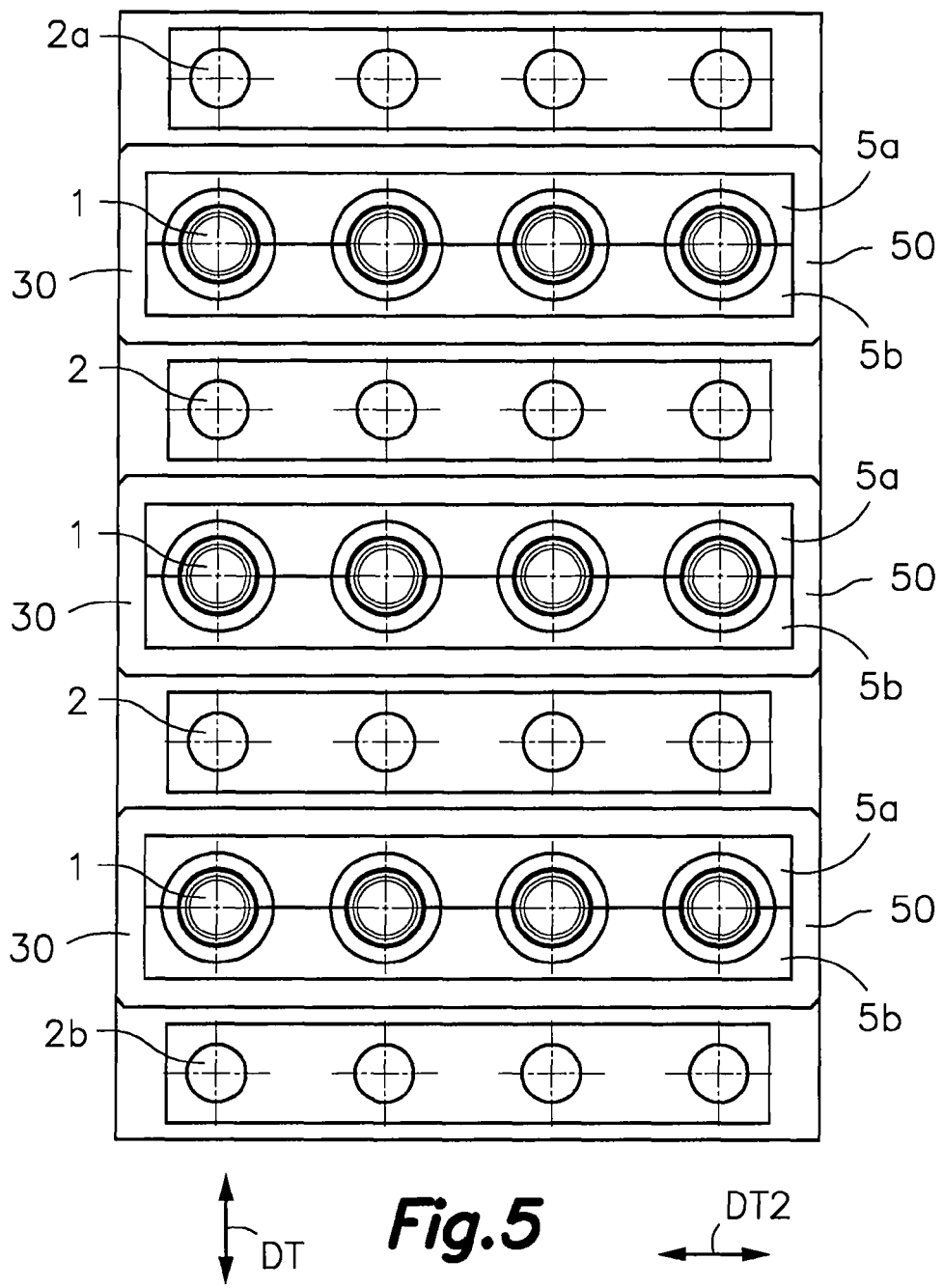
FIG. 5 is a front view of a fixed part of an apparatus according to a variant of the embodiment of FIG. 1.
Figure 6:
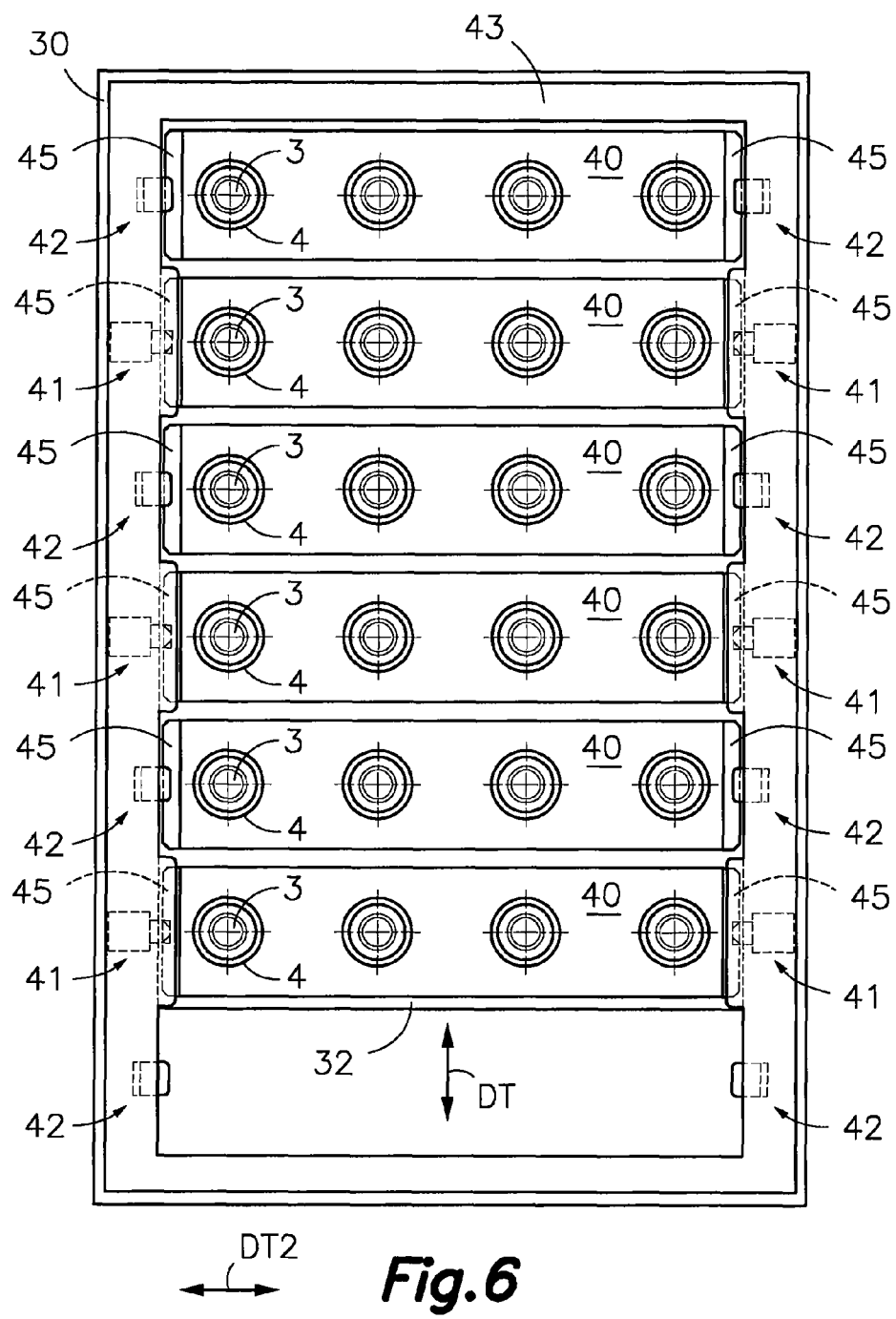
FIG. 6 is a front view of a mobile part of the apparatus of FIG. 5.

FIGS. 5 and 6 respectively show front views of the fixed part and the mobile part of an apparatus according to a variant of the embodiment of FIG. 1, the object of which is to multiply the productivity. The only difference is that: where in FIG. 1 there is a base molding cavity 1, an overmolding cavity 2, 2a, 2b or a pair of half-molds 5a, 5b, in the embodiment of FIG. 5 there is a row of base molding cavities 1, a row of overmolding cavities 2, 2a, 2b or a row of pairs of half-molds 5a, 5b, respectively; and where in FIG. 1 there is a core 3 with an ejecting element 4 associated thereto, in the embodiment of FIG. 6 there is a row of cores 3 and a row of ejecting elements 4 associated thereto. In other words, FIG. 1 could be a side longitudinal cross section view of the apparatus of the embodiment of FIGS. 5 and 6, where each row extends in a second transverse direction DT2 perpendicular to the mentioned transverse direction DT and perpendicular to the longitudinal direction DL, and has one and the same number m of equidistant elements. As a result, in the fixed part shown in FIG. 5 there is a formation of cavities formed by a number n (three in the example shown) of rows of m (four in the example shown) base molding cavities 1 and a number n+1 (four in the example shown) of rows of m (four in the example shown) overmolding cavities 2, 2a, 2b. In the mobile part shown in FIG. 6 there is a number 2n (six in the example shown) of rows of m (four in the example shown) cores 3.

All the pairs of half-molds 5a, 5b of each row are mounted on a common half-mold holder plate 50, such that there is a number n of half-mold holder plates 50, as shown in FIG. 5. All the rows of cores 3 are mounted on a single core holder plate 32 and the ejecting elements 4 of each row are linked to a common ejecting plate 40, such that there is a number 2n of ejecting plates 40, as shown in FIG. 6. Adjacent to the base plate 30 there is arranged an actuation plate 43 in the form of a frame in which there are arranged first selecting elements 41 in positions coinciding with the positions of the rows of base molding cavities 1, and in the base plate 30 there are mounted second selecting elements 42 in positions coinciding with the positions of the overmolding cavities 2, 2a, 2b. The ejecting plates 40 have configurations 45 adapted to be coupled alternately with said first and second selecting elements 41, 42 according to the first and second positions adopted by the core holder plate 32 in relation to the base plate 30 as a result of its movements in the transverse direction DT. Thus, the first selecting elements 41 link the ejecting plates 40 to said actuation plate 43, which is actuated to move in a longitudinal direction DL driving the corresponding ejecting plates 40 and the rows of ejecting elements 4 associated thereto towards the ejecting position during each ejecting step. The second selecting elements 42 link the corresponding ejecting plates 40 and the rows of ejecting elements 4 associated thereto to the base plate 30, retaining them in the molding position during each ejecting step.

A person skilled in the art will understand that an alternative embodiment (not shown) similar to that described in relation to FIGS. 5 and 6 but derived from the embodiment described above in relation to FIG. 2 instead of a version of the apparatus described in FIG. 1 is immediately feasible. In other words, an apparatus similar to that described in relation to FIGS. 5 and 6 but adapted to produce bi-material pre-forms Q such as that shown in FIG. 4. In this variant, the only variation in the fixed part in relation to that shown in FIG. 5 is that the positions of the base molding cavities 1 and the overmolding cavities 2 are exchanged and the only variation in the mobile part in relation to that shown in FIG. 8 for the purpose of carrying out ejecting operations is that a unique common ejecting plate 40 is used with a simpler mechanism.

However, there is no impediment for use the arrangement of ejecting elements 4 and corresponding ejecting plates 40 of the embodiment shown in FIG. 5 with the embodiment shown in FIG. 6 for making bi-material pre-forms Q of the type shown in FIG. 4. This would have the additional advantage of allowing adapting the apparatus for producing bi-material pre-forms of the type P shown in FIG. 3 or of the type Q shown in FIG. 4 by simply exchanging the positions of the base molding cavities 1 and the overmolding cavities 2.

According to a variant not shown of the embodiment described in relation to FIGS. 5 and 6, the apparatus of the invention incorporates multiple cavities and cores grouped into formations other than rows. For example, each row of cavities or cores can be substituted with a group of cavities or cores arranged according to a matrix formed by a number of columns and a number of rows, although other types of formations arranged, for example, in a staggered manner, are possible. Thus, where in FIG. 5 there is a row of base molding cavities 1, a row of overmolding cavities 2, 2a, 2b or a row of pairs of half-molds 5a, 5b in this variant there is a group of base molding cavities 1, a group of overmolding cavities 2, 2a, 2b or a group of pairs of half-molds 5a, 5b, respectively. Similarly, where in FIG. 6 there is a row of cores 3 and a row of ejecting elements 4 associated thereto in this variant there is a group of cores 3 and a group of ejecting elements 4 associated thereto.

In said variant, all the pairs of half-molds 5a, 5b of each group are mounted on a common half-mold holder plate 50, such that there is a number n of half-mold holder plates 50, and all the groups of cores 3 are mounted on a single core holder plate 32. The ejecting elements 4 of each group are linked to a common ejecting plate 40, such that there is a number 2n of ejecting plates 40, which are actuated selectively by an actuation plate in cooperation with first and second selecting elements 41, 42, in a manner similar to that described above in relation to FIG. 6.

Obviously, a variant such as that described above incorporating groups of different elements of the rows but derived from the embodiment of FIG. 2 for producing bi-material pre-form Q of the type shown in FIG. 4 instead of being derived from the embodiment shown in FIG. 1 for producing bi-material pre-form P of the type shown in FIG. 3, is possible. Likewise, it is obvious that any of the embodiments described above are applicable to the production of other types of bi-material hollow bodies different from the pre-forms, such as, for example, lids, caps, glasses, containers, etc.

Figure 7:
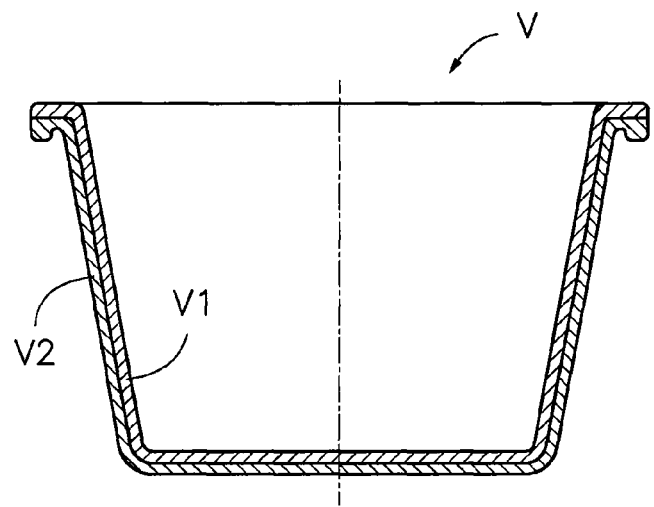
FIG. 7 is a longitudinal cross section view of another bi-material hollow body obtainable by means of an apparatus of the invention.

By way of example, FIG. 7 shows a bi-material vessel in the form of a cup V suitable for being manufactured by means of an apparatus according to any of the previously described embodiments. The bi-material cup V is formed by a first layer V1 made of a base molding material and a second layer V2 made of an overmolding material. Given that the shapes of the first and second layers V1, V2 of the bi-material cup V allow a direct demolding thereof without needing to incorporate half-molds adapted to be opened and closed, the half-molds 5a, 5b and the half-mold holder plates 50 can be omitted.

Figure 8:
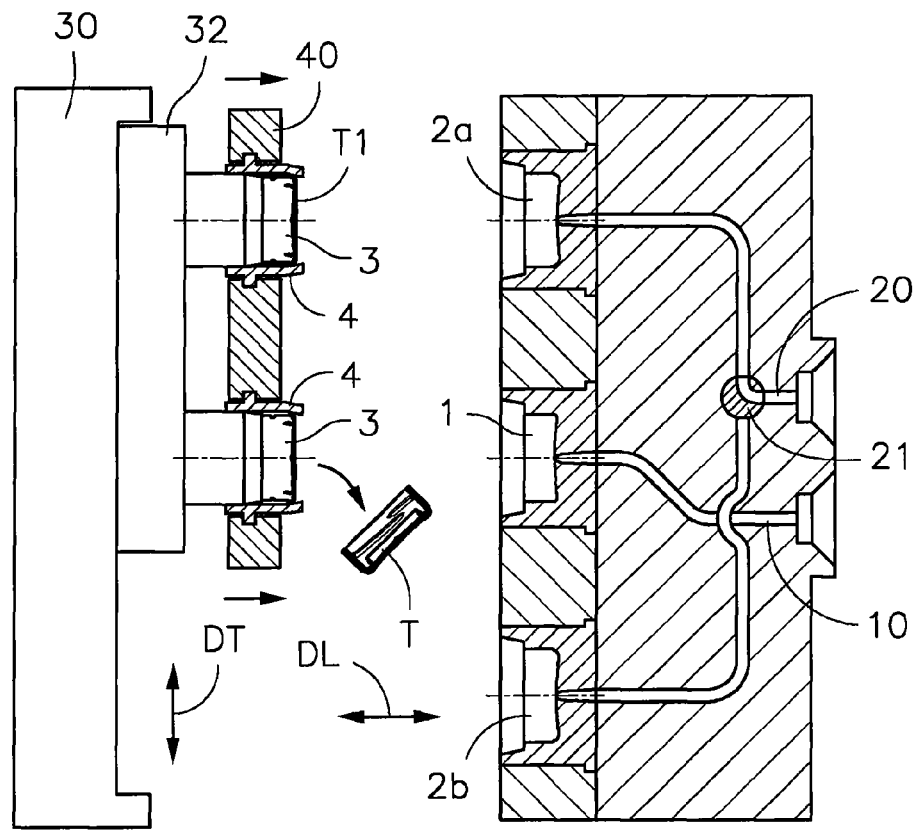
FIG. 8 is a diagrammatic longitudinal cross section view of an apparatus for the production of bi-material hollow bodies by means of injection overmolding according to a third embodiment of the invention.

FIG. 8 shows another embodiment of the apparatus of the invention applied to the production of bi-material caps T. FIG. 11 shows a cross-section of one of said bi-material caps T, which is formed by a first layer T1 made of a base molding material and a second layer T2 made of an overmolding material. The apparatus of FIG. 10 comprises a fixed part with a base molding cavity 1 arranged between first and second end overmolding cavities 2a. A first hot channel 10 is connected to supply base molding material to the base molding cavity 1 and a second hot channel 20 is connected to supply overmolding material to the first and second end overmolding cavities 2a, 2b. Valve means, such as a valve 21, are arranged to allow alternately the passage of overmolding material to both of the first and second end overmolding cavities 2a, 2b. The mobile part comprises a base plate 30 actuated to move in a longitudinal direction DL, a core holder plate 32 mounted on the base plate 30 and actuated to move in the transverse direction DT in relation thereto, a pair of cores 3 fixed to the core holder plate 32, a pair of ejecting elements 4, each associated to one of the cores 3, and a single ejecting plate 40 linked to the ejecting elements 4 and actuated to simultaneously move all the ejecting elements 4 in relation to the core holder plate 32 in a longitudinal direction DL.

The kinematics of the base plate 30 and of the core holder plate 32 is the same as that describe above in relation to FIG. 1, but limited to just two cores 3 in correspondence with one base molding cavity 1 and two end overmolding cavities 2a, 2b. However, it is obvious that the apparatus shown in FIG. 8 can be generalized to have a number 2n of cores 3 or groups of cores 3 in correspondence with a number n of base molding cavities 1 or groups of base molding cavities 1 and a number n+1 of overmolding cavities 2, 2a, 2b or groups of overmolding cavities 2, 2a, 2b arranged as explained above in relation with FIG. 1.

Figure 9:
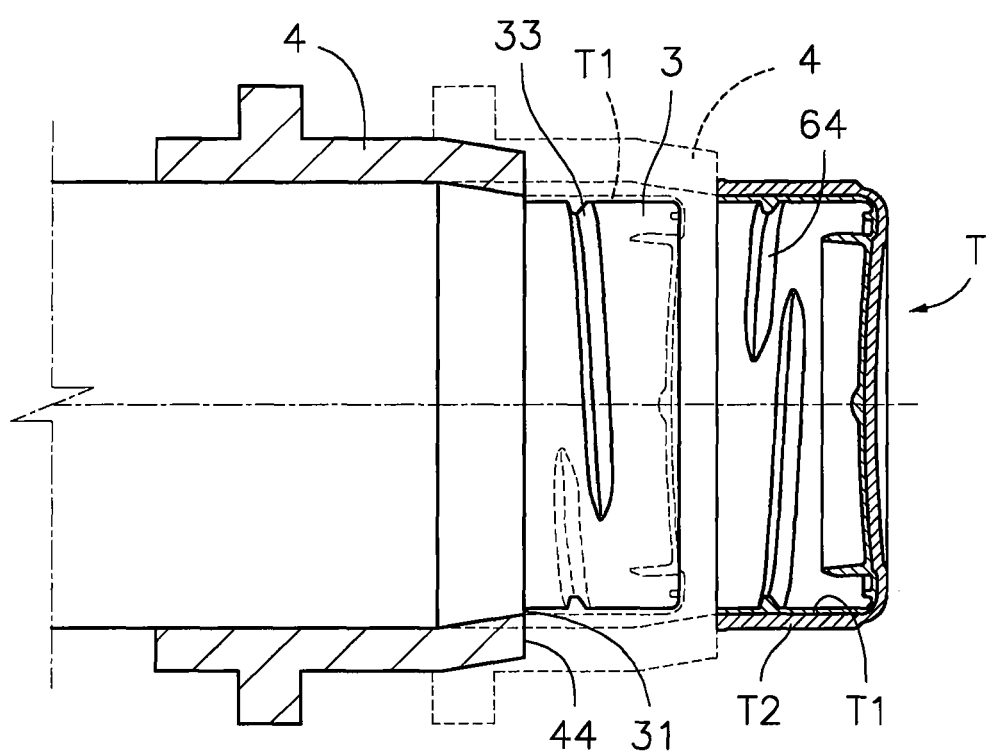
FIG. 9 is a longitudinal cross section view of an example of a bi-material hollow body obtained by means of the apparatus of FIG. 8, where an end of the core and an ejecting element associated thereto are also shown.
Figure 10:
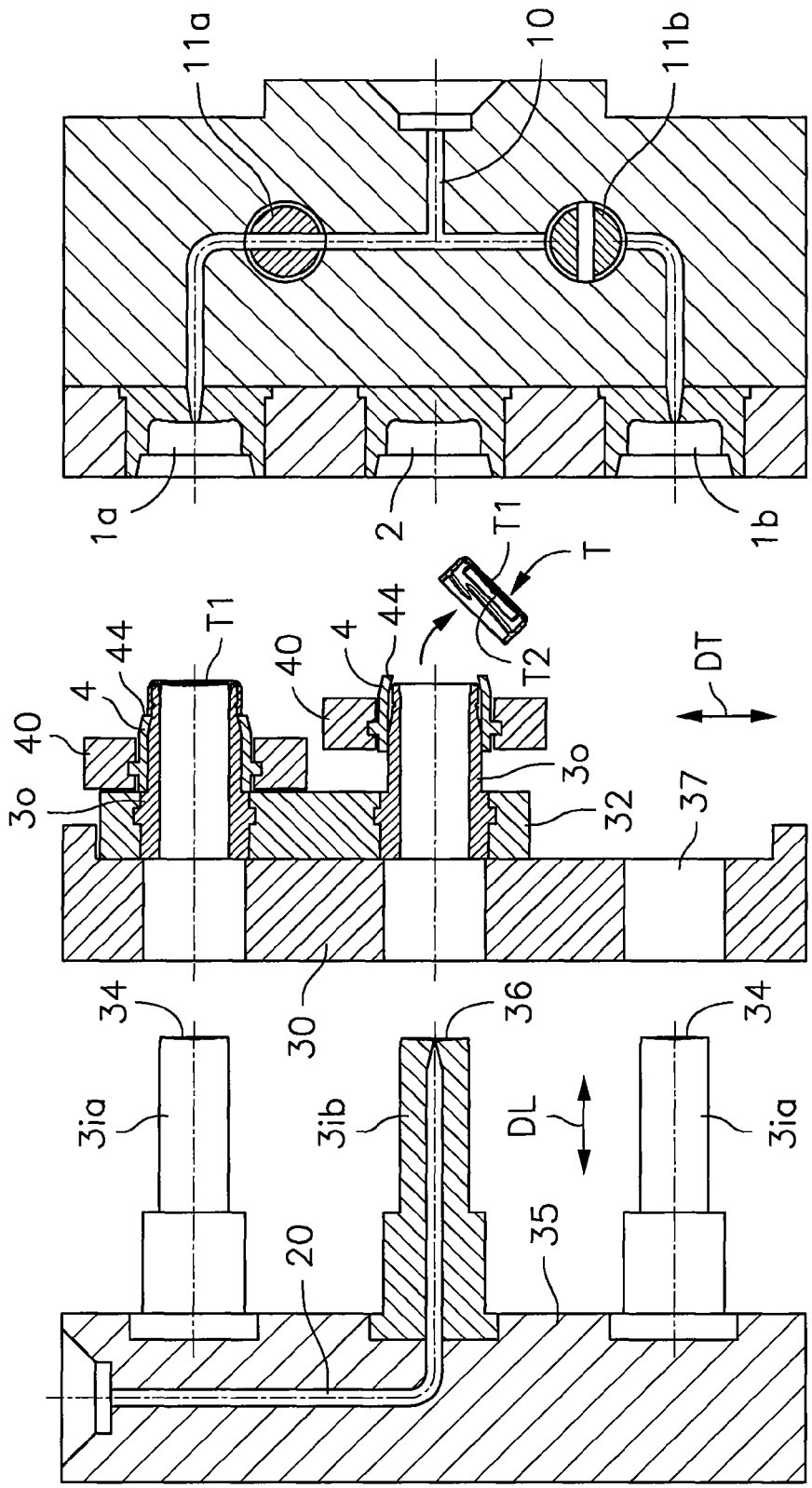
FIG. 10 is a schematic longitudinal cross-section view of an apparatus for the production of bi-material hollow bodies by means of injection overmolding according to a fourth embodiment of the present invention derived from the second embodiment shown in FIG. 2, including cores formed by two superposed coaxial portions.

The bi-material cap T does not comprise any external threading or another outer configuration requiring half-molds adapted to be closed and opened next to the opening of the base molding cavities 1 or overmolding cavities 2a, 2b, therefore such half-molds are omitted. However, as shown in FIG. 11, the first layer T1 of the bi-material cap T defines an internal threading 64. The same FIG. 11 shows the core 3 defining a part of mold for the inner surface of the first layer T1 including mold configurations 33 for said internal threading 64. The ejecting element 4 is adapted to eject the bi-material cap T extracting the internal threading 64 from the mold configurations 33 of the core 3 by plastic deformation of the bi-material cap T. In the apparatus of FIG. 10, the mold for the first layer T1 is formed by an inner surface of the base molding cavity 1, the outer surface of the core 3, and a ring-shaped surface provided by a step 31 (FIG. 11) formed in the base of the core 3. The mold for the second layer T2 is formed by an inner surface of the first or second end overmolding cavity 2a, 2b, an outer surface of the first layer T1 arranged on the core 3, and an end ring-shaped surface 44 of the corresponding ejecting element 4. As a result, the ejecting element 4 can be moved towards its ejecting position (shown in dotted lines in FIG. 9) without interfering with the first layer T1 (also shown in dotted lines in FIG. 9) when it is arranged on the core 3. However, when the ejecting element 4 is moved towards its ejecting position, the end ring-shaped surface 44 interferes with the second layer T2 of the bi-material cap T formed on the core 3 to eject it from the core 3.

For this reason, in the embodiment of FIG. 8 the two ejecting elements are linked to the same ejecting plate 40 and are shown in their ejecting positions. The ejecting element 4 associated to the core 3 opposite to the first end overmolding cavity 2a has carried out its movement in the longitudinal direction DL without interfering with the first layer T1 arranged on the core 3. However, ejecting element 4 associated to the core 3 opposite to the molding cavity 1 has carried out its movement in the longitudinal direction DL interfering with the second layer T2 adhered to the first layer T1, thus ejecting the finished bi-material cap T from the core 3.

FIG. 10 shows another embodiment of the apparatus of the present invention applied to the production of bi-material caps T, where the overmolding material is injected through the core. The apparatus of FIG. 10 comprises a fixed part with an overmolding cavity 2 arranged between first and second base molding cavities 1a, 1b. A first hot channel 10 is connected to supply base molding material to the base molding cavities 1a, 1b. Valve means, such as first and second valves 11a, 11b, are arranged to alternately allow the passage of base molding material to the first and second base molding cavities 1a, 1b, respectively. Obviously, the pair of valves 11a, 11b could be substituted with a single three-way valve 21 such as that shown in FIG. 1 with an identical result.

Here, each of the cores is formed, in an injection position, by two coaxial portions: an outer core portion 3o in the form of a sleeve fixed to a first core holder plate 32 and an inner core portion 3i, 3ia, 3ib fixed to a second core holder plate 35 and capable of being tightly inserted into the outer core portion 3o. As a result, in this embodiment the mobile part comprises a base plate 30 that is actuated to move in the longitudinal direction DL, with the first core holder plate 32 mounted thereon and actuated to move in the transverse direction DT. In the first core holder plate 32 there are fixed two of said identical outer core portions, associated to a pair of respective ejecting elements 4 linked to respective ejecting plates 40 actuated to alternately move both of the ejecting elements 4 in relation to the first core holder plate 32 in the longitudinal direction DL. The kinematics of the base plate 30 and of the first core holder plate 32 is similar to that described above in relation to FIG. 2.

The mobile part further comprises the mentioned second core holder plate 35, which is actuated to move in the longitudinal direction DL and on which there are fixed an inner overmolding core portion 3i between first and second inner base molding core portions 3ia, 3ib. The mentioned inner overmolding core portion 3i is aligned with the overmolding cavity 2 and said first and second inner base molding core portions 3ia, 3ib are respectively aligned with the first and second base molding cavities 1a, 1b. The base plate 30 has openings 37 configured and arranged to allow the passage therethrough of the inner core portions 3i, 3ia, 3ib. A second hot channel 20 is connected to supply overmolding material through an opening in the distal end of the inner overmolding core portion 3i.

The operation is as follows. In a first closed mold position (not shown), one of the outer core portions 3o (for example, the outer core portion 3o located at the upper part of FIG. 10) is inserted into the first base molding cavity 1a (located at the upper part of FIG. 10) and the other outer core portion 3o is inserted into the overmolding cavity 2. The first inner base molding core portion 3ia is furthermore inserted into the outer core portion 3o which is in turn inserted in the first base molding cavity 1a and the inner overmolding core portion 3i is inserted into the outer core portion 3o which is in turn inserted in the overmolding cavity 2. The second inner base molding core portion 3ib is inserted in an idle manner into the second base molding cavity 1b. The first valve 11a is in an open position to allow the passage of the base molding material towards the first base molding cavity 1a whereas the second valve 11b is in a closed position.

In this first closed position, an inner surface of the first base molding cavity 1a cooperates with an end ring-shaped surface 44 of the corresponding ejecting element 4, an outer surface of the corresponding outer core portion 3o and an outer surface 34 of the first inner base molding core portion 3ia to define a gap which will be filled with the molding material injected through the first hot channel 10 and the first valve 11a to form a first layer T1, or outer layer, of the cap T, whereas an inner surface of a first layer T1 previously formed and arranged on the outer core portion 3o inserted in the overmolding cavity 2 cooperates with an end surface of the same outer core portion 3o and an end surface 36 of the corresponding inner overmolding core portion 3i to define a gap which will be filled with the overmolding material injected through the second hot channel 20 and the inner overmolding core portion 3i to form a second layer T2, or inner layer, of the cap T.

The mold is then moved to the open position shown in FIG. 12, and the ejecting plate 40 linked to the ejecting element 4 associated to the outer core portion 3o recently removed from the overmolding cavity 2 is moved in the longitudinal direction DL to eject the finished cap T. The first core holder plate 32 is then moved in the transverse direction DT until aligning the outer core portion 3o located at the upper part of FIG. 12, which carries the recently formed first layer T1, with the overmolding cavity 2 and the other outer core portion 3o, which is now free, with the second base molding cavity 1b. The mold is then taken to a second closed position and the positions of the valves are reversed such that the first valve 11a is closed and the second valve 11b is open to allow injecting base molding material to the second base molding cavity 1b to form a new first layer T1. At the same time, the overmolding material can be injected through the inner overmolding core portion 3i to form a second layer T2 on the previously formed first layer T1 and now received in the overmolding cavity 2. The cycle is thus repeated successively.

Obviously, it is possible to construct an apparatus similar to that of FIG. 12 but derived from the embodiment of FIG. 1, i.e., with the base molding cavity connected with the first hot channel and the inner base molding core portion located at the center and the overmolding cavities and the inner overmolding core portions located at the ends, with the second hot channel arranged to supply overmolding material through the inner overmolding core portions in cooperation with corresponding valve means. In both cases, the apparatus could be generalized for multiple groups of cavities and cores in a manner similar to that described above in relation to FIGS. 1 and 2.

A method for the production of bi-material hollow bodies by means of injection overmolding using an apparatus according to the embodiment of FIG. 1 or any one of the embodiments and variants derived from the embodiment of FIG. 1 comprises the following cyclic steps:

a) inserting the formation of cores 3 with the first layer of base molding material molded on the first half of the cores 3 in said second set of cavities, said first layer of base molding material having been molded on the mentioned second half of the cores 3 in a previous molding cycle;

b) arranging said valve means 21 to allow the passage of overmolding material towards the second end overmolding cavity 2b or second end group of overmolding cavities 2b;

c) simultaneously injecting base molding material through said first hot channel 10 to the base molding cavities 1 and overmolding material through a second hot channel 20 to the overmolding cavities 2, 2b;

d) extracting the formation of cores 3 from the second set of cavities with the first layer of base molding material molded on a second half of the cores 3 and finished bi-material hollow bodies P, Q, T, V formed by the first layer of base molding material and the second layer of overmolding material molded on said first half of cores 3;

e) moving the formation of cores 3 until aligning it with the first set of cavities;

f) ejecting the hollow body P, Q, T, V from the first half of cores 3;

g) inserting the formation of cores 3 with the first layer of base molding material molded on said second half of the cores 3 in the first set of cavities;

i) arranging said valve means 21 to allow the passage of overmolding material towards the first end overmolding cavity 2a or first end group of overmolding cavities 2a;

j) simultaneously injecting base molding material through the first hot channel 10 to the base molding cavities 1 and overmolding material through said second hot channel 20 to the overmolding cavities 2, 2a;

k) extracting the formation of cores 3 from the first set of cavities with the first layer of base molding material molded on the first half of the cores 3 and bi-material hollow bodies P, Q, T, V formed by the first layer of base molding material and the second layer of overmolding material molded on the second half of cores 3;

l) moving the formation of cores 3 until aligning it with the second set of cavities; and m) ejecting the hollow bodies P, Q, T, V from the second half of cores 3.

A method for the production of bi-material hollow bodies by means of injection overmolding using an apparatus according to the embodiment of FIG. 2 or any one of the embodiments and variants derived from the embodiment of FIG. 2 comprises the following cyclic steps:

a) inserting the formation of cores 3 with a first layer of base molding material molded on a first half of the cores 3 in said second set of cavities, said first layer of base molding material having been molded on the mentioned first half of the cores 3 in a previous molding cycle;

b) arranging said valve means 11, 11a, 11b, to allow the passage of base molding material towards the second end base molding cavity 1b or second end group of base molding cavities 1b;

c) simultaneously injecting base molding material through the first hot channel 10 to the base molding cavities 1, 1b and overmolding material through a second hot channel 20 to the overmolding cavities 2;

d) extracting the formation of cores 3 from the second set of cavities with the first layer of base molding material molded on a second half of the cores 3 and bi-material hollow bodies P, Q, T, V formed by the first layer of base molding material and the second layer of overmolding material molded on the first half of cores 3;

e) ejecting the hollow bodies P, Q, T, V from the first half of cores 3;

f) moving the formation of cores 3 until aligning it with the first set of cavities;

g) inserting the formation of cores 3 with the first layer of base molding material molded on said second half of the cores 3 in the first set of cavities;

i) arranging said valve means 11, 11a, 11b to allow the passage of base molding material towards the first end base molding cavity 1a or first end group of base molding cavities 1a;

j) simultaneously injecting base molding material through the first hot channel 10 to the base molding cavities 1, 1a and overmolding material through said second hot channel 20 to the overmolding cavities 2;

k) extracting the formation of cores 3 from the first set of cavities with the first layer of base molding material molded on the first half of the cores 3 and bi-material hollow bodies P, Q, T, V formed by the first layer of base molding material and the second layer of overmolding material molded on the second half of cores 3;

l) ejecting the hollow bodies P, Q, T, V from the second half of cores 3; and m) moving the formation of cores 3 until aligning it with the second set of cavities.

It will be understood that in both variants of the method, some steps can be carried out in an order different from that set forth above. For example, the steps of ejecting the hollow bodies and/or the steps of controlling the distribution of molding or overmolding material to the end cavities by means of the valve means can be carried out either before or after the steps of moving the formation of cores in the transverse direction DT to align it with the following first or second sets of cavities.

In the operation of the apparatus according to the embodiment shown in FIG. 12, the step of moving the formation of cores until aligning it with the corresponding set of cavities comprises moving only the outer portions of the cores.

In any of the embodiments of the invention, the base molding cavities, overmolding cavities and cores are provided with cooling fluid circuits of a conventional type, the description of which has been omitted and which allow suitably cooling the layers of molding and overmolding material.

A person skilled in the art will be able to introduce variations and modifications in the embodiments shown and described without departing from the scope of the invention as it is defined in the attached claims.

The invention claimed is:

1. An apparatus for the production of bi-material hollow bodies by means of injection overmolding, comprising:

a first hot channel connected to supply a base molding material to a number n+1 of base molding cavities or groups of base molding cavities, with n>1, said base molding material being intended for making a first layer of a bi-material hollow body;

a second hot channel connected to supply an overmolding material to a number n of overmolding cavities or groups of overmolding cavities, said overmolding material being intended for making a second layer of said bi-material hollow body, wherein said base molding cavities or groups of base molding cavities and said overmolding cavities or groups of overmolding cavities are alternately arranged in a formation along a transverse direction, and wherein the cavities or groups of cavities located at the two ends of said formation are first and second end base molding cavities or first and second end groups of base molding cavities, respectively;

a base plate on which there is mounted a core holder plate carrying a similar formation of a number 2n of cores or groups of cores, wherein said core holder plate is actuated to be moved alternately on the base plate in said transverse direction between two positions in which the cores or groups of cores are aligned respectively with first and second sets of cavities, each formed by said number n of overmolding cavities or groups of overmolding cavities and a number n of the base molding cavities or groups of base molding cavities including one or the other of said first and second end base molding cavities or first and second end groups of base molding cavities, respectively, and wherein said base plate is actuated to be moved in a longitudinal direction between a closed position, in which the cores or groups of cores are introduced in said first or second sets of cavities, and an open position, in which the cores or groups of cores are extracted from the first or second sets of cavities;

valve means arranged in said first hot channel to alternately allow or interrupt the passage of base molding material towards the first and second end base molding cavities or first and second end groups of base molding cavities, according to the positions of the base plate and core holder plate; and ejecting means adapted to eject the finished hollow bodies only from those cores or groups of cores which have been extracted from overmolding cavities or groups of overmolding cavities, wherein said ejecting means comprise a number 2n of ejecting elements or groups of ejecting elements, with each ejecting element associated to one of the cores, said ejecting elements or groups of ejecting elements being connected to a common ejecting plate, each ejecting element having an innermost part located at a distance far enough from the corresponding core for not engaging said first layer of the bi-material hollow body arranged on the core and near enough to the corresponding core for engaging said second layer of the bi-material hollow body arranged on the first layer.

2. The apparatus according to claim 1, wherein each ejecting element has the form of a bushing arranged around the corresponding core, and wherein each mold for overmolding a second layer of the hollow body is formed in part by an end ring-shaped surface of the corresponding ejecting element.

3. The apparatus according to claim 1, further comprising one or more half-mold holder plates on which there are mounted a number n of pairs of half-molds or groups of pairs of half-molds, each pair of half-molds being adapted and actuated to be closed next to the opening of one of the overmolding cavities and to be opened, the half-molds of each pair having corresponding inner surfaces forming a part of a mold for molding a second layer made of overmolding material of the hollow body.

4. The apparatus according to claim 3, wherein said hollow body is a bi-material pre-form, and wherein an inner surface of the base molding cavity, and an outer surface of the core are adapted to form a mold for molding said first layer made of base molding material of said bi-material pre-form, and an inner surface of the overmolding cavity, an outer surface the first layer arranged on the core, an end ring shaped surface of the ejecting element, and said inner surfaces of the half-molds are adapted to form a mold for overmolding said second layer made of overmolding material of the bi-material pre-form including an outer part of an externally threaded neck formed by the inner surfaces of the half-molds.

5. The apparatus according to claim 1, wherein said number n+1 of groups of base molding cavities is a number n+1 of rows of base molding cavities, said number n of groups of overmolding cavities is a number n of rows of overmolding cavities and said number 2n of groups of cores is a number 2n of rows of cores.

6. The apparatus according to claim 1, wherein each of the cores is formed by an outer core portion in the form of a sleeve fixed to said core holder plate and an inner core portion fixed to a second core holder plate and capable of being inserted in the outer core portion through a corresponding opening formed in the base plate by a movement of said second core holder plate in the longitudinal direction, wherein on the second core holder plate there are fixed a number n of inner overmolding core portions or groups of inner overmolding core portions aligned with the overmolding cavities and a number n+1 of inner base molding core portions or groups of inner base molding core portions aligned with the base molding cavities, and wherein the second hot channel is arranged to supply the overmolding material to the overmolding cavities through said inner overmolding core portions.

7. An apparatus for the production of bi-material hollow bodies by means of injection overmolding, comprising:

a first hot channel connected to supply a base molding material to a number n of base molding cavities or groups of base molding cavities, with n>1, said base molding material being intended for making a first layer of a bi-material hollow body;

a second hot channel connected to supply an overmolding material to a number n+1 of overmolding cavities or groups of overmolding cavities, said overmolding material being intended for making a second layer of said bi-material hollow body;

wherein said base molding cavities or groups of base molding cavities and said overmolding cavities or groups of overmolding cavities are alternately arranged in a formation along a transverse direction, and wherein the cavities or groups of cavities located at the two ends of said formation are first and second end overmolding cavities or first and second end groups of overmolding cavities, respectively;

a base plate on which there is mounted a core holder plate carrying a similar formation of a number 2n of cores or groups of cores, wherein said core holder plate is actuated to be moved alternately on the base plate in said transverse direction between two positions in which the cores or groups of cores are aligned respectively with first and second sets of cavities, each formed by said number n of base molding cavities or groups of base molding cavities and a number n of overmolding cavities or groups of overmolding cavities including one or the other of said first and second end overmolding cavities or first and second end groups of overmolding cavities, respectively, and wherein said base plate is actuated such that it can move in a longitudinal direction between a closed position, in which the cores or groups of cores are introduced in said first or second sets of cavities, and an open position, in which the cores or groups of cores are extracted from the first or second sets of cavities;

valve means arranged in said second hot channel to alternately allow or interrupt the passage of overmolding material towards the first and second end overmolding cavities or first and second end groups of overmolding cavities, according to the positions of the base plate and core holder plate; and ejecting means adapted to eject the finished hollow bodies only from those cores or groups of cores which have been extracted from overmolding cavities or groups of overmolding cavities, wherein said ejecting means comprise a number 2n of ejecting elements or groups of ejecting elements, with each ejecting element associated to one of the cores, said ejecting elements or groups of ejecting elements being connected to a common ejecting plate, each ejecting element having an innermost part located at a distance far enough from the corresponding core for not engaging said first layer of the bi-material hollow body arranged on the core and near enough to the corresponding core for engaging said second layer of the bi-material hollow body arranged on the first layer.

8. The apparatus according to claim 7, further comprising one or more half-mold holder plates on which there are mounted a number n of pairs of half-molds or groups of pairs of half-molds, each pair of half-molds being adapted and actuated to be closed next to the opening of one of the base molding cavities and to be opened, the half-molds of each pair having corresponding inner surfaces forming a part of a mold for molding said first layer made of base molding material of the hollow body.

9. The apparatus according to claim 8, wherein said hollow body is a bi-material pre-form, and wherein an inner surface of the base molding cavity, an outer surface of the core, an end ring-shaped surface of the ejecting element and said inner surfaces of the half-molds are adapted to form a mold for molding said first layer made of base molding material of said bi-material pre-form including an externally threaded neck formed by the inner surfaces of the half-molds, and an inner surface of the overmolding cavity and an outer surface of said first layer made of base molding material arranged on the core are adapted to form a mold for overmolding a second layer made of overmolding material of the bi-material pre-form.

10. The apparatus according to claim 7, wherein said number n of groups of base molding cavities is a number n of rows of base molding cavities, said number n+1 of groups of overmolding cavities is a number n+1 of rows of overmolding cavities and said number 2n of groups of cores is a number 2n of rows of cores.

11. The apparatus according to claim 7, wherein each of the cores is formed by an outer core portion in the form of a sleeve fixed to said core holder plate and an inner core portion fixed to a second core holder plate and capable of being inserted in the outer core portion through a corresponding opening formed in the base plate by a movement of said second core holder plate in the longitudinal direction, wherein on the second core holder plate there are fixed a number n+1 of inner overmolding core portions or groups of inner overmolding core portions aligned with the overmolding cavities and a number n of inner base molding core portions or groups of inner base molding core portions aligned with the base molding cavities, and wherein the second hot channel is arranged to supply the overmolding material to the overmolding cavities through said inner overmolding core portions.

* * * * *